Nov. 26, 1940.   C. H. BEEBE ET AL   2,223,201
INDICATOR FOR MOTOR VEHICLE LIGHTS
Filed Aug. 23, 1938
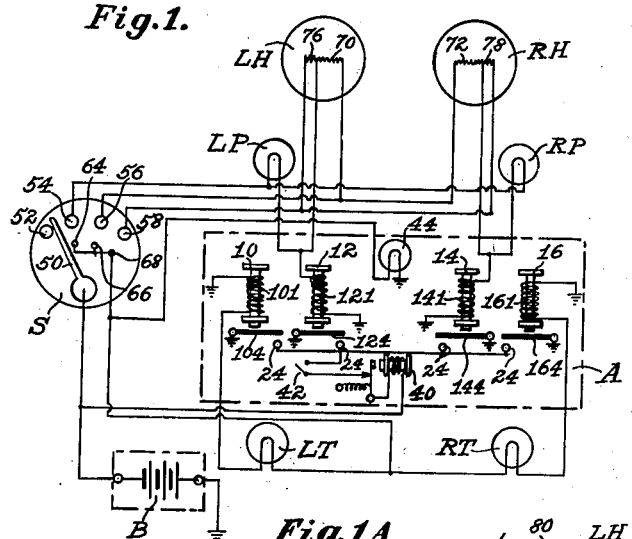
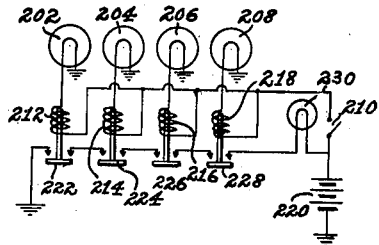
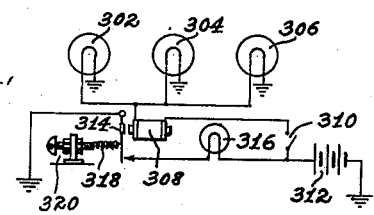
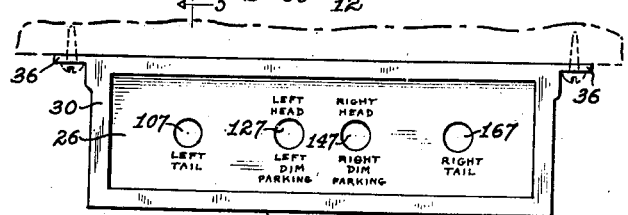
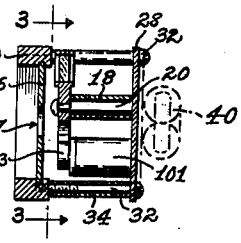
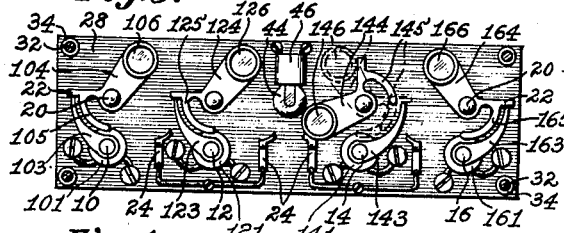
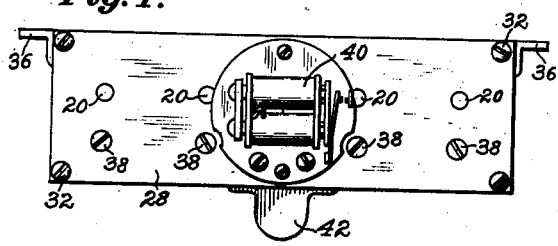
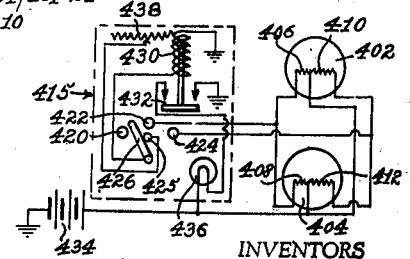
INVENTORS
Charles H. Beebe
Wallace E. Beebe
August Bostrom
ATTORNEY.

Patented Nov. 26, 1940

2,223,201

UNITED STATES PATENT OFFICE 2,223,201

INDICATOR FOR MOTOR VEHICLE LIGHTS

Charles H. Beebe, New York, N. Y., and Wallace E. Beebe, Roselle Park, N. J.

Application August 23, 1938, Serial No. 226,234

2 Claims. (Cl. 177—311)

This invention relates generally to indicators for motor vehicle lights, and more particularly it relates to indicators intended to warn the operator of a motor vehicle of a failure in the system of running lights on his vehicle.

It is hardly necessary to point out the importance of a properly functioning system of running lights in the prevention of accidents. With the increase of motor vehicle traffic it will become of still more importance. Aside from the fact that the driver of a motor vehicle (even if he is irresponsible enough not to care for the safety of the occupants of other vehicles with whom he runs the danger of colliding), is naturally concerned with his own safety, it is to his interest to have his lights functioning properly to avoid the presumption of negligence that arises if his opponent in a collision suit is able to show that one or more of his lights was out at the time of the accident. It is also to be expected that where ordinances do not already penalize drivers who use the highway for vehicles with defective lighting equipment (even though the defect may have been due to a failure of the lights while running), that laws will in the near future be enacted penalizing drivers with such defective equipment. For these reasons it is now, and in the future will be all the more desirable that the driver of a motor vehicle be informed immediately of the failure of any of his running lights, so that he can correct the situation before an accident occurs or before he is penalized.

It is therefore among the general objects of our invention to provide an indicator for the running lights of a motor vehicle that will warn a driver of the failure of any of his lights immediately on the occurrence of such failure, and further to provide such an indicator that will be simple, effective, reliable, and low in cost of manufacture and maintenance.

Among the more particular objects of our invention are the provision in an indicator of the type mentioned, of a visible signalling device to warn the driver of a motor vehicle of the failure of any of his running lights, the provision in an indicator of the type mentioned of an audible signalling device to warn the driver of a motor vehicle of the failure of any of his running lights, and the provision in an indicator of the type mentioned of a visible signalling device and an audible signalling device, so that the driver will be warned through two of his senses, whereby his overlooking the signal, either through inattentiveness or through failure of his sense of sight or hearing, will be greatly minimized.

More specifically it is also among the objects of our invention to provide an indicator for the running lights of a motor vehicle that will inform the operator whether his lighting switch is on or off, as well as informing him of the failure of any of his running lights.

Among the objects of our invention are further the provision of an indicator of the type mentioned that will indicate to the driver the failure of any one particular light in his system of lights, and the provision in an indicator of the type mentioned of a single warning signal to indicate the failure of any one of a plurality of lights where these lights are used alternately and never together.

These objects and such other objects as will hereinafter appear or be pointed out, are attained in the illustrative embodiments of our invention disclosed in the drawing, in which:

Figure 1 is a diagrammatic view showing the electrical circuits and connections of one embodiment of our invention;

Figure 1A is a diagrammatic view showing a portion of the electrical circuits of a modified form of the embodiment of Figure 1;

Figure 2 is a front elevational view of the casing of our improved indicator;

Figure 3 is a longitudinal view substantially on the line 3—3 of Figure 5, looking in the direction of the arrows and disclosing the interior mechanism of our indicator;

Figure 4 is a rear elevational view of the indicator;

Figure 5 is a transverse sectional view substantially on the line 5—5 of Figure 2, looking in the direction of the arrows, parts being broken away to disclose constructional details;

Figure 6 is a view in perspective of the mechanism shown at the left of Figure 3; and Figures 7, 8 and 9 are respectively diagrammatic views showing electrical circuits and connections of other embodiments of our invention.

Referring now to the drawing in detail, and first of all to the embodiment of Figures 1 to 6 inclusive, it will be observed that in Figure 1 we have shown diagrammatically a system of motor car running lights, comprising right and left head lights designated respectively by the letters LH and RH, and each being shown as of the two filament type wherein one filament can be used to obtain a strong beam while the other filament is used when it is desired to dim the headlights. The system further comprises a pair of parking lights designated respectively by the letters LP and RP, and a pair of tail lights designated respectively by the letters LT and RT. While we have not shown a stop light, it is to be understood that our invention contemplates the inclusion of stop light circuits if desired, and such circuits may be readily added to the circuits shown in Figure 1, as will be obvious when the invention is more fully understood.

Our improved motor car light indicator, as shown diagrammatically in Figure 1, has been designated by the letter A, a lighting switch by the letter S, and a battery for furnishing current to the system by the letter B.

The details of our indicator will now be described with the aid of Figures 2 to 6 inclusive as well as Figure 1.

At 10, 12, 14 and 16 we have shown electromagnets each provided with a pole piece projecting laterally therefrom at its end. The coils by means of which the magnets are energized have been numbered 101, 121, 141 and 161 respectively and the pole pieces have been numbered 103, 123, 143 and 163 respectively.

Associated with each of these electromagnets is a pivotally mounted member provided at one end with an armature adapted to be attracted by the pole piece of its associated magnet, and provided at its other end with a transparent light screen for a purpose that will hereinafter appear. The pivotally mounted members have been designated in the drawing by the numerals 104, 124, 144 and 164, their armature ends by numerals 105, 125, 145 and 165 respectively, and their light screens by numerals 106, 126, 146 and 166 respectively.

The pivotally mounted members 104, 124, 144 and 164 are shown mounted on horizontal axes in any suitable or preferred manner, such as the construction indicated in Figure 5, in which the member 105 is shown as provided with a tubular extension 18 through which passes a headed pin 20.

The members 104, 124, 144 and 164 are so constructed that they will normally swing into the position shown in Figure 3 for the member 144 by the action of gravity, for which purpose the armature end is made lighter than the light screen end. When however a magnet is energized the armature is attracted into the position shown for the other members 104, 124, and 164 in Figure 3 and indicated in dot and dash lines for the member 144.

It will be understood, of course, that the armature portions 105, 125, 145 and 165 are of magnetizable material so that they will be attracted by the electromagnets. The light screen carrying portions of members 104, 124, 144 and 164 are made of electrically conducting material for a purpose that will become clear as the invention is better understood. By making the said members, including the armature portions, of electrical steel, the purposes of our invention will be achieved.

Attention may here be called to the arcuate contour of the pole pieces 103, 123, 143 and 163, which are complementary to the arcuate contour of the armatures 105, 125, 145 and 165, each of these having its outer face formed on a radius having as its center the axis of pivoting of the members 104, 124, 144 and 164. Between the pole pieces and the armatures is an air gap the area of which increases as the armature moves, and thereby varies the reluctance of the magnetic circuit in accordance with the well-known laws of magnetism. By this construction we are enabled to obtain a wide arc of swing for the armatures and for the light screens 106, 126, 146 and 166 such as is needed for the proper performance of their function.

Stop means are shown to limit the swing of the members 104, 124, 144 and 164. These means are shown in the form of an extension 22 on each armature adapted to strike the end of the pole piece to limit the movement of the armature when it is attracted by the magnets, and stop pieces 24 adapted to limit the movement of the pivotally mounted members in the opposite direction. One of the stops 24 is shown in its active position in Figure 3 in relation to the member 144. The stop pieces 24 are of electrically conducting material, for a purpose that will appear hereinafter, and they are so positioned that they become active when the light screens 106, 126, 146 and 166 are in registration respectively with openings or windows 107, 127, 147 and 167 provided in the front panel 26 of the indicator (see Figures 2 and 5).

The parts so far described are shown as mounted on a panel 28 (see Figures 3, 4 and 5) that constitutes the back of the indicator and is supported on the main frame 30 of the indicator (see Figures 2 and 5) in any suitable or preferred manner such as by the screws 32 surrounded by bushings 34 to hold the panel 28 in the proper spaced relation.

The frame 30 may be provided with any suitable or preferred means for attaching it to the dashboard or other place in the motor vehicle. Such means is shown in the form of lugs 36 carried by the frame 30, through which may be passed screws to effect the desired connection, as indicated in Figure 2.

Carried on the back of the panel 28 is shown an audible alarm device, such as the buzzer 40, and a switch by which the buzzer may be disconnected when desired is shown at 42 (see Figures 2 and 4). The stops 24 are connected in parallel in the buzzer circuit so that when any one of the pivoted members 104, 124, 144 and 164 strikes its associated stop 24, the buzzer circuit will be closed and the buzzer will sound.

Within the casing is shown illuminating means, such as the incandescent bulb 44 mounted is a socket 46 and suitably connected to a source of current, as the battery B. This bulb serves to emit light that will pass through the openings or windows 107, 127, 147 and 167, and where, as shown in Figure 1, this bulb is suitably connected in the lighting switch circuit, it will indicate to the operator of the motor vehicle that his running lights are connected to the battery B.

Normally the light will pass unobstructed through the windows 107, 127, 147 and 167, but when one of the running lights fails, the corresponding one of the light screens 105, 125, 145, 165 will drop into a position in front of the window and the light must then pass through the light screen. Such a position is shown for the light screen 146 in Figure 3.

The light screens 106, 126, 146 and 166 are preferably made of colored transparent material, such for example as red glass, so that the color thereof attracts the operator's attention. The openings 107, 127, 147 and 167 are appropriately marked as shown in Figure 2 and when the operator notices a red color at a particular window it will tell him that a particular one of his running lights has failed, as will be clear when the invention is more fully understood. For example, if the pivoted member 144 drops from the dot and dash line position in Figure 3, which it assumes when the lights associated therewith are functioning properly, into the full line position shown in that figure, the third window from the left in Figure 2 will show red. This window is marked "Right head" above the window and "Right dim parking" below the window. If the lighting switch is in the dim position the operator will know that his dim head light filament has failed, if his lighting switch is in the bright headlight position, he will know that his bright headlight filament has failed, while if his switch is in the parking light position he will know that his parking light has failed.

As already stated, all of the windows are appropriately marked (see Figure 2) so that the operator by glancing at his indicator can tell without leaving the vehicle which particular one, if any, of his lights has failed.

Should the operator fail to glance at his indicator, the audible alarm device will function to attract his attention, as will now be explained. It will be observed that the pivoted member 144 in dropping strikes the contact 24 and thereby completes the buzzer circuit as already mentioned. On hearing this signal the operator will look at his indicator and will then be more particularly informed. If desired he may then turn off the buzzer by means of the switch 42, so as to avoid the annoyance of hearing it until the defective light is replaced. Of course he must be careful to throw the switch in the "on" position again so that the buzzer will again be operative when required.

It will be understood that appropriate wires and connectors, binding posts and the like are provided. It will be unnecessary for us to describe these in detail as their use is well understood by those skilled in the art.

One manner of effecting the electrical connections of the indicator of Figures 2 and 6 to a system of running lights is shown in Figure 1, and these connections will now be described and the operation of the device summarized in connection therewith.

It will be observed that the switch S has its finger 50 connected to the battery B so that when it touches any of the switch contacts, these will become alive. The contact 52 of the switch corresponds to the "off" position of the switch. When the finger 50 touches the aligned contacts 54 and 64, current will pass into the indicator light 44 to indicate that current is on the running lights. Current will at the same time pass through the two tail lights LT and RT and through the magnet coils 101 and 161 associated respectively therewith. Current will also pass through the two parking lights and through the magnet coils 121 and 141 associated therewith.

If light LP should fail the coil 121 is deenergized, the armature 123 is released and strikes contact 24, and, switch 42, being closed, operates the buzzer while at the same time the window 127 shows red.

The operation of the device when light LT fails is similar.

When the finger 50 of the switch S covers contacts 56 and 66 the light 44 and the tail lights go on and at the same time the dim filaments 70 and 72 of the head lights together with coils 121 and 141 are thrown into the circuit. If filament 70 fails, the coil 121 is deenergized, the armature 123 is released, window 127 shows red and the buzzer sounds. The operation when filament 72 fails, being in all respects similar, needs no further description.

When the switch finger 50 covers contacts 58 and 68 the high power filaments 76 and 78 of the head lights LH and RH are similarly thrown in through the coils 121 and 141. In view of what has already been said in relation to the dim filaments of the head lights, the operation of the device when one of these filaments fails will be understood, and further description thereof may be omitted as superfluous.

It will be understood that before the switch S is thrown on all the windows 107, 127, 147 and 167 are covered by their respective light screens 106, 126, 146 and 166. They remain so until in operating the switch S the magnets 10, 12, 14 and 16 are energized. Until this occurs the indicator is dark, while as soon as the switch is thrown on the light 44 goes on and illuminates the interior of the indicator, and a portion of the light passes through the windows. It will therefore be apparent that the indicator not merely serves to show failure of the lights, but also shows whether the lighting switch is on or off.

It will be understood that instead of arranging the members 104, 124, 144 and 164 to swing on horizontal axes, they might be arranged to swing on axes otherwise disposed, such as vertical axes for example. In that event of course means other than gravity must be provided for effecting the return movement of the trusted members. Such means might be in the form of springs pulling the pivoted members in a direction opposed to the pull of the electromagnets.

The indicator just described is intended to indicate the exact location of failure, and this is accomplished by four signal windows. This is possible because in the system of Figure 1 there are never more than four lights burning at any one time, and therefore the same window may be used for more than one light, provided the lights associated with the window are used alternately and never at the same time. If desired, of course, a separate window might be used for each light. In that case eight windows would be needed for the system of lights of Figure 1. This would be convenient in that no reference need be made to the position of the lighting switch to determine which light has failed, but has the disadvantage of loss of compactness. As a compromise other arrangements might be used. For instance if six windows are used, two of them might each be used for two lights, say the two headlight filaments. Where double filament headlights are used this is in some respects equivalent to a separate window for each light, since the headlight should be replaced whichever filament burns out.

On the other hand it is sufficient for some purposes if the operator gets a signal as soon as one of the lights burns out, without any indication from the signal as to the particular light that failed. Or again a single signal may be used for a group of lights and individual signals for others of the lights. Such systems, while they have the disadvantage of not indicating the failure with particularity, have the advantage of greater compactness and economy. Examples of such systems will be described hereinafter.

In Figure 1A we have shown a modification of a portion of the circuits of Figure 1. In this figure parts similar to the parts of Figure 1 have been similarly lettered or numbered, but the letters or numbers have been primed.

In this figure is shown a magnet 12' having three coils 128, 129 and 130 thereon adapted to energize it. Each of these coils is connected on one side to a terminal of the lighting switch S, and on its other side to one of the lights, while the finger 50' of the switch S' is connected to the battery B'.

The coil 128 is shown connected to the parking light LP'. The headlight LH' is shown in this figure as having two separate lights therein, of which 80 may be the dim one and 86 the bright one. The coil 129 is shown as connected to bulb 80 and the coil 130 to the bulb 86.

This construction may have advantages over that of Figure 1 for particular purposes. It will be noted that it enables connection of the lighting switch to the magnet of the indicator, whereas in Figure 1 the switch must be connected to the lights. For this reason the construction of Figure 1 is perhaps preferable where the indicator is to be added to an existing installation, already wired with a lighting switch, while the arrangement of Figure 1A may be convenient where the switch and indicator constitute a single unit.

It is to be understood that the diagram of Figure 1A is not intended to be complete, and that other lights are intended to be added. The manner of adding such other lights will be apparent on comparing the diagram of Figure 1 with that of Figure 1A.

In the embodiment of Figure 7 we have shown diagrammatically a circuit in which a single indicator is used for a plurality of running lights, the number of lights being shown by way of example as four, although it will be obvious that any number may be used. In this figure the running lights are designated by numerals 202, 204, 206 and 208 and they are shown connected in parallel to a source of current 220 through a switch 210, and each light has in series therewith the coil of an electromagnetically operated switch. The switches have been numbered 222, 224, 226 and 228 and their coils 212, 214, 216 and 218. The switches are shown as connected in series with each other and with a pilot or signal light 230.

The operation of this device will be readily understood. When the switch 210 is closed the lights 202, 204, 206 and 208 go on and the switches 222, 224, 226 and 228 close so that the signal light 230 operates. If any one of the running lights fails its corresponding switch opens and light 230 goes out.

This embodiment has the disadvantage that the exact location of the failure is not known. However, since the operator, once he knows that a failure exists, would have to get out of the vehicle anyway in order to replace the defective light, and once he does so inspection would soon tell him which light had failed, such an indicator may be satisfactory for particular requirements.

It will of course be understood that the showing of Figure 7 is diagrammatic and that the constructional details of the embodiment of Figures 1 to 6 inclusive may be utilized therein or in modifications thereof. For example the magnet and window system of Figure 3 may be used instead of the light 210.

In the embodiment of Figure 8 we have shown diagrammatically an arrangement whereby a single signal, operated by a single electromagnet serves as an indicator for a plurality of running lights. While we have shown three lights, it will be understood that we do not necessarily restrict ourselves to that number, and that more than three or less than three may be used.

At 302, 304 and 306 we have shown the running lights connected in parallel with each other, and all in series with the coil of electromagnet 308 and with a switch 310 and energized from a source of current 312. When the switch 310 is closed the armature 314 moves toward the magnet 308 and closes the circuit of the signal light 316.

When one of the lights fails the current in the magnet 308 is reduced, and, under the pull of spring 318, the armature 314 will move away from the magnet and will open the circuit of light 316.

At 320 is shown an arrangement for varying the tension of spring 318 so that the circuit of light 316 will open when any one of the running lights fails. In this manner the device may be made to operate even when the capacity of the running lights is altered.

This embodiment is open to the same objection as that of Figure 7, namely that the exact location of the failure is not indicated.

It will be understood that in the physical embodiments of the arrangement of Figure 8 the constructional details of the embodiment of Figures 1 to 6 may be incorporated.

In the embodiment of Figure 9 we have shown diagrammatically an arrangement by which a single signal is controlled by a single magnetic coil to indicate the condition of four running lights, used alternately two at a time. The four lights are shown in the form of two head lights each provided with a bright and dim filament operated alternately, the two bright ones being used together or the two dim ones being used together. In this embodiment we have also shown an indicator having a lighting switch as an integral part thereof.

At 402 and 404 we have shown two filament head lights having respectively bright filaments 406 and 408 and dim filaments 410 and 412.

The indicator is designated as a whole by the numeral 415 and a source of current to energize the lights by numeral 434.

The indicator 415 comprises a signal light 436, an electromagnetic switch 432 provided with a coil 430 and a lighting switch comprising a finger 426, and contacts 420, 422, 424 and 425.

When finger 426 is on contact 420 the lights are off. When finger 426 contacts 422 and 425 the bright filaments 406 and 408 are energized and the coil 430 which is thrown in series with these filaments is also energized and closes switch 432 so that the signal light goes on. When either filament 406 or 408 fails the coil 430 is partly deenergized. The weight of the armature 432 is made sufficient so that it will drop and the light 436 goes out, indicating the failure, even though the current of the other light is still passing through the coil 430.

When finger 426 contacts 424 the dim filaments 410 and 412 are energized, as is the coil 430. Failure of either filament is again indicated by the light going out.

If the current passing through coil 430 is different when filaments 406 and 408 are connected than it is when filaments 410 and 412 are connected the switch 432 may not operate properly unless compensating means is provided as will be explained. For example if filaments 410 and 412 take two amperes that is, one ampere each, the switch 432 must close for two amperes and must open when the current is reduced to one ampere. If now the filaments 406 and 408 take four amperes, which passes through the coil 430 of the switch, the switch will close. If one filament fails, however, this still leaves a current of two amperes in coil 430, and this is still sufficient to keep the switch closed, and the failure of the filament will not be indicated.

To correct this condition we may provide compensating means in the form of a by-pass, such as a resistor 438 having one end connected to contact 425 and its other end grounded, so that it is connected in parallel with the coil 430 when the switch finger 426 is on contacts 422 and 425. By this arrangement a portion of the currents from the filaments 406 and 408 is shunted through the resistor 438, and the current in coil 430 may by this means be reduced until it is the same as the current in filaments 410 and 412, and the switch 432 will then function as desired for either set of filaments.

In order to provide for various conditions we have shown the resistor 436 adjustable.

As will be readily understood each of the two filament bulbs might be replaced by two separate bulbs without essential modification of the system.

This embodiment also, does not indicate the exact location of the failure. The constructional details of this embodiment, may, like those of Figures 7 and 8 include details of the embodiment of Figures 1 to 6. In particular a colored light screen or screens may be substituted for the signal lights or added thereto, and the audible alarm system may be used. It will be further understood that particular features of the various embodiments may be utilized in others of the embodiments or may be combined so as to form still other embodiments.

While we have herein disclosed several illustrative embodiments of our invention and described their operation, it will be understood that our invention may be embodied in many other forms without departing from the spirit thereof, as will be obvious to those skilled in the art, and that the disclosure herein is to be interpreted as illustrative merely and not in a limiting sense, and that we do not limit ourselves other than as called for by the prior art.

Having thus described our invention and illustrated its use what we claim as new and desire to secure by Letters Patent is:

1. In a combined lighting switch and indicating device for indicating the condition of a plurality of sets of lights, the lights of each set being of the same current capacity, but the lights of one set being of a different current capacity from the lights of the other set; a lighting switch having a plurality of terminals each connected to one terminal of said set of lights, and said lighting switch further having an adjustable contactor adapted to selectively engage any one of said lighting switch terminals, a signal light, an electromagnetic switch having a single coil of which one terminal is connected to said contactor, said electromagnetic switch being connected to open and close the signal light circuit, a by-pass for said coil of said electromagnetic switch in the form of a resistor, a contact in said lighting switch adapted to be engaged by the contactor of said lighting switch simultaneously with one of said terminals connected to one of said sets of lights, said contact being connected to one terminal of said by-pass resistor, and the other terminal of said resistor being connected to the other terminal of the coil of said electromagnetic switch and to one terminal of a source of electricity having its other terminal connected to the other terminal of each of said sets of lights, and the capacity of said electromagnetic switch and of said by-pass resistor being respectively such that for any setting of the lighting switch by which any one of said sets of lights is energized, the electromagnetic switch will open the signal light circuit whenever a single one of the lights in the energized set fails.

2. In an indicating device for automobile lights arranged in sets, each set comprising a pair of lights, the lights of each set having the same current capacity, and being connected in parallel, but the current capacity of the lights of one set being different from that of the lights of the other set, a lighting switch having a plurality of terminals each connected to one terminal of said set of lights, and said lighting switch further having an adjustable contactor adapted to selectively engage any of said lighting switch terminals, a signal light, an electromagnetic switch having a single coil of which one terminal is connected to said contactor, said electromagnetic switch being connected to open and close the signal light circuit, a by-pass for said coil of said electromagnetic switch in the form of an adjustable resistor having a fixed terminal and a movable contact in said lighting switch adapted to be engaged by the contactor of said lighting switch simultaneously with one of said terminals thereof connected to one of said sets of lights, said contact being connected to the movable contact of said resistor, and the fixed terminal of said by-pass resistor, being connected to the other terminal of the coil of said electromagnetic switch which is grounded, a source of electricity having one side grounded and the other side connected to the other terminal of said sets of lights, and the capacity of said electromagnetic switch being such that when it is connected to one of said sets of lights without being by-passed by said resistor, it will close the signal light circuit when all the lights of the set are burning but will open the signal light circuit when one of the lights of the set fails, and the resistor being adjustable to such a capacity that when said electromagnetic switch is connected to the other set of lights together with the by-pass, said electromagnetic switch will function with this other set of lights as it did with the previously mentioned set.

CHARLES H. BEEBE.
WALLACE E. BEEBE.